(12) United States Patent
Dodson

(10) Patent No.: US 6,398,248 B1
(45) Date of Patent: Jun. 4, 2002

(54) TRAINER ATTACHMENT FOR A BICYCLE

(76) Inventor: Alison Dodson, 24000 Alicia Pkwy. #17, Mission Viejo, CA (US) 92691

( * ) Notice: Subject to any disclaimer, the term of this patent is extended or adjusted under 35 U.S.C. 154(b) by 0 days.

(21) Appl. No.: 09/693,633

(22) Filed: Oct. 20, 2000

(51) Int. Cl.[7] .................................................. B62H 7/00
(52) U.S. Cl. .................................................... 280/293
(58) Field of Search ............................ 280/293, 288.4, 280/304.5

(56) References Cited

U.S. PATENT DOCUMENTS

| | | |
|---|---|---|
| 3,650,544 A | 3/1972 | Cassell |
| 4,903,975 A | 2/1990 | Weisbrodt et al. |
| 5,154,096 A * | 10/1992 | Geller et al. ................. 280/293 |
| 5,217,240 A | 6/1993 | Gardenhour, Jr. et al. |
| D339,090 S | 9/1993 | Gardenhour, Jr. et al. |
| 5,259,638 A * | 11/1993 | Krauss et al. ................. 280/293 |
| 5,306,030 A * | 4/1994 | Becka ........................ 280/282 |
| 5,395,130 A | 3/1995 | Rubin |
| 5,407,222 A | 4/1995 | Harrison |
| 5,564,726 A * | 10/1996 | Hearn et al. ................. 280/293 |
| 5,577,750 A * | 11/1996 | Sklar ........................ 280/293 |
| 5,606,772 A | 3/1997 | Ilic |
| 5,915,711 A * | 6/1999 | Seiple ....................... 280/293 |

FOREIGN PATENT DOCUMENTS

DE           3534262       *  5/1987

* cited by examiner

Primary Examiner—Kevin Hurley

(57) ABSTRACT

A trainer attachment for a bicycle for guiding a child learning how to ride a bicycle. The trainer attachment for a bicycle includes an elongate handle member having a main portion, a first end portion, a second end portion, and a second end; and also includes mounting brackets for mounting the elongate handle member to a bicycle; and further includes protection members being adapted to mount about cross members of a frame of the bicycle; and also includes a fastening assembly for fastening the mounting brackets, protection members and elongate handle member to the bicycle.

13 Claims, 3 Drawing Sheets

TRAINER ATTACHMENT FOR A BICYCLE

BACKGROUND OF THE INVENTION

1. Field of the Invention

The present invention relates to a bicycle riding trainer and more particularly pertains to a new trainer attachment for a bicycle for guiding a child learning how to ride a bicycle.

2. Description of the Prior Art

The use of a bicycle riding trainer is known in the prior art. More specifically, a bicycle riding trainer heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,217,240; U.S. Pat. No. Des. 339,090; U.S. Pat. No. 4,903,975; U.S. Pat. No. 5,407,222; U.S. Pat. No. 5,395,130; U.S. Pat. No. 3,650,544; and U.S. Pat. No. 5,606,772.

While these devices fulfill their respective, particular objectives and requirements, the aforementioned patents do not disclose a new trainer attachment for a bicycle. The inventive device includes an elongate handle member having a main portion, a first end portion, a second end portion, and a second end; and also includes mounting brackets for mounting the elongate handle member to a bicycle; and further includes protection members being adapted to mount about cross members of a frame of the bicycle; and also includes a fastening assembly for fastening the mounting brackets, protection members and elongate handle member to the bicycle.

In these respects, the trainer attachment for a bicycle according to the present invention substantially departs from the conventional concepts and designs of the prior art, and in so doing provides an apparatus primarily developed for the purpose of guiding a child learning how to ride a bicycle.

SUMMARY OF THE INVENTION

In view of the foregoing disadvantages inherent in the known types of bicycle riding trainer now present in the prior art, the present invention provides a new trainer attachment for a bicycle construction wherein the same can be utilized for guiding a child learning how to ride a bicycle.

The general purpose of the present invention, which will be described subsequently in greater detail, is to provide a new trainer attachment for a bicycle which has many of the advantages of the bicycle riding trainer mentioned heretofore and many novel features that result in a new trainer attachment for a bicycle which is not anticipated, rendered obvious, suggested, or even implied by any of the prior art bicycle riding trainer, either alone or in any combination thereof.

To attain this, the present invention generally comprises an elongate handle member having a main portion, a first end portion, a second end portion, and a second end; and also includes mounting brackets for mounting the elongate handle member to a bicycle; and further includes protection members being adapted to mount about cross members of a frame of the bicycle; and also includes a fastening assembly for fastening the mounting brackets, protection members and elongate handle member to the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trainer attachment for a bicycle which has many of the advantages of the bicycle riding trainer mentioned heretofore and many novel features that result in a new trainer attachment for a bicycle which is not anticipated, rendered obvious, suggested, or even implied by any of the prior art bicycle riding trainer, either alone or in any combination thereof.

It is another object of the present invention to provide a new trainer attachment for a bicycle which may be easily and efficiently manufactured and marketed.

It is a further object of the present invention to provide a new trainer attachment for a bicycle which is of a durable and reliable construction.

An even further object of the present invention is to provide a new trainer attachment for a bicycle which is susceptible of a low cost of manufacture with regard to both materials and labor, and which accordingly is then susceptible of low prices of sale to the consuming public, thereby making such trainer attachment for a bicycle economically available to the buying public.

Still yet another object of the present invention is to provide a new trainer attachment for a bicycle which provides in the apparatuses and methods of the prior art some of the advantages thereof, while simultaneously overcoming some of the disadvantages normally associated therewith.

Still another object of the present invention is to provide a new trainer attachment for a bicycle for guiding a child learning how to ride a bicycle.

Yet another object of the present invention is to provide a new trainer attachment for a bicycle which includes an elongate handle member having a main portion, a first end portion, a second end portion, and a second end; and also includes mounting brackets for mounting the elongate handle member to a bicycle; and further includes protection members being adapted to mount about cross members of a frame of the bicycle; and also includes a fastening assembly for fastening the mounting brackets, protection members and elongate handle member to the bicycle.

Still yet another object of the present invention is to provide a new trainer attachment for a bicycle that can be easily and quickly attached to any bicycle.

Even still another object of the present invention is to provide a new trainer attachment for a bicycle that allows the user to control and hold the bicycle in an upright position so that the child can learn to balance oneself on the bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
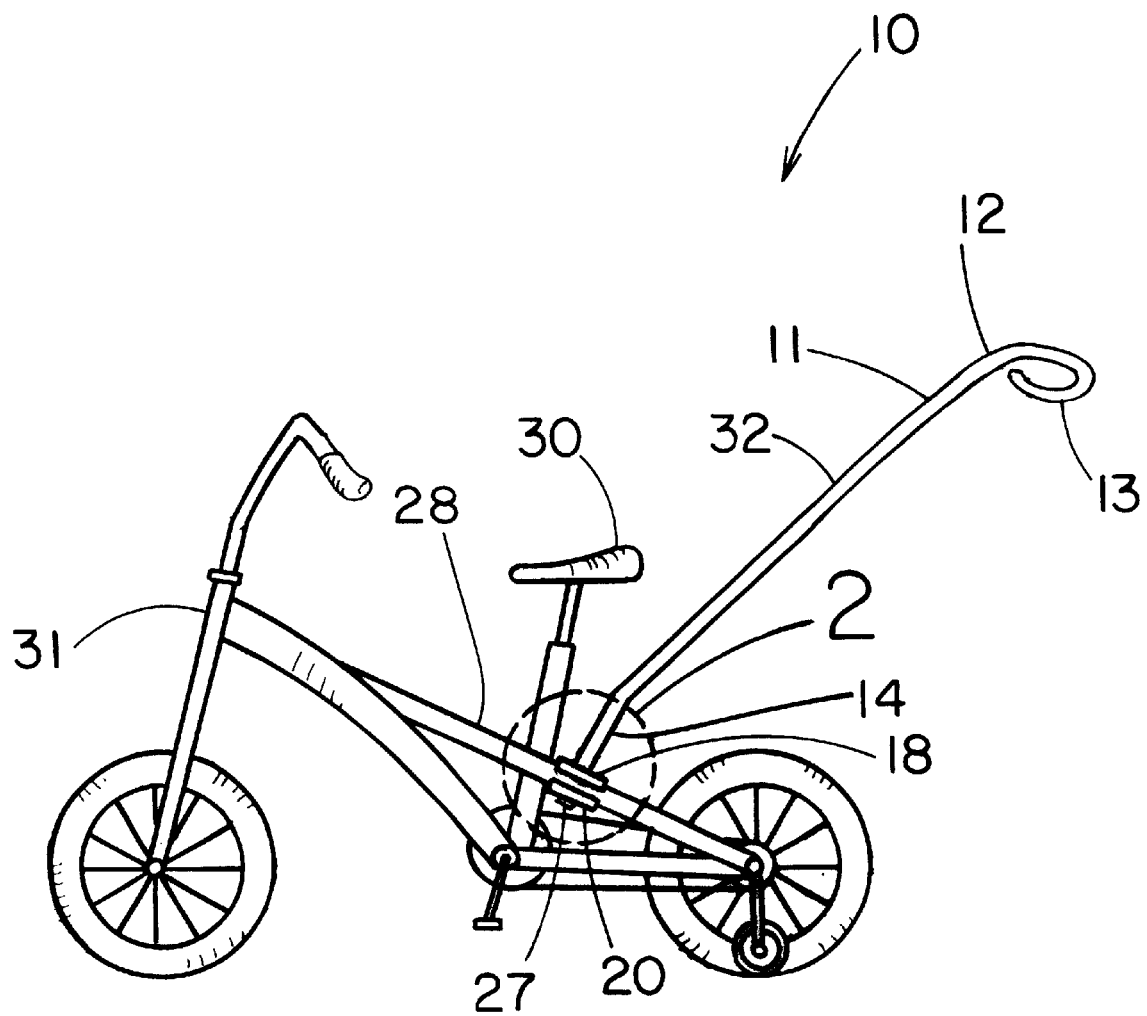
FIG. 1 is a side elevational view of a new trainer attachment for a bicycle according to the present invention and shown in use.
Figure 2:
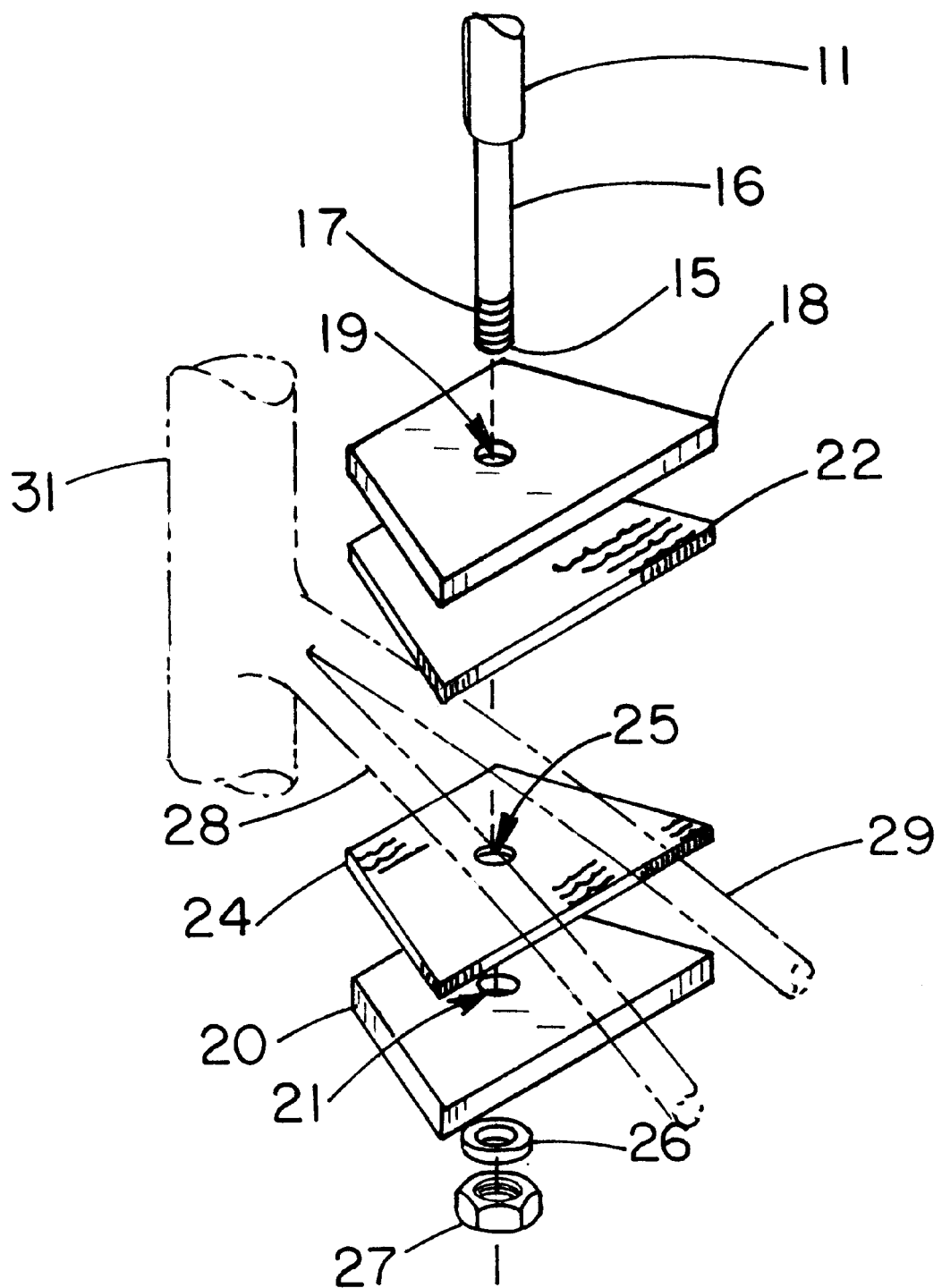
FIG. 2 is a perspective view of the mounting brackets and pad members of the present invention.
Figure 3:
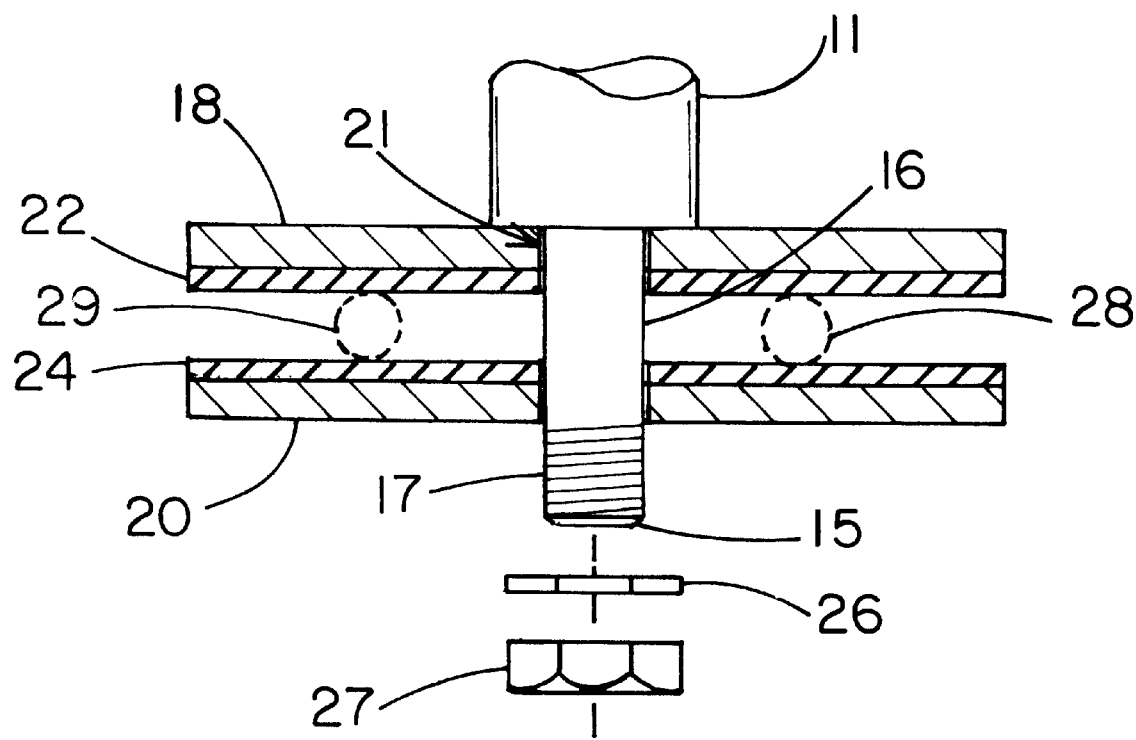
FIG. 3 is a cross-sectional view of the mounting brackets and pad members of the present invention.

With reference now to the drawings, and in particular to FIGS. 1 through 3 thereof, a new trainer attachment for a bicycle embodying the principles and concepts of the present invention and generally designated by the reference numeral 10 will be described.

As best illustrated in FIGS. 1 through 3, the trainer attachment for a bicycle 10 generally comprises an elongate handle member 11 having a main portion 32, a first end portion 12, a second end portion 14, and a second end 15. The elongate handle member 11 also includes a looped first end 13 for facilitating grasping of the elongate handle member 11 by a user. The first end portion 12 is angled relative to the main portion 32, and the second end portion 14 is also angled relative to the main portion 32. The elongate handle member 11 is adapted to extend upwardly and rearwardly of a bicycle 31 to allow a user to control the bicycle 31 from behind the bicycle 31. The elongate handle member 11 further includes an annular recessed portion 16 disposed at the second end 15 of the elongate handle member 11. The annular recessed portion 16 has a threaded portion 17 at the second end 15 of the elongate handle member 11. The main portion 32 of the elongate handle member 11 has a length of approximately 27 inches. The first end 13 of the elongate handle member 11 is conventionally coated with a rubberized material to facilitate the grasping thereof by the user.

Mounting brackets 18,20 for mounting the elongate handle member 11 to the bicycle 31 include first and second mounting brackets 18,20 which are adapted to mount about portions of cross members 28,29 of a frame of the bicycle 31. Each of the mounting brackets 28,29 is generally a plate-like member having a centrally-disposed hole 19,21 therethrough.

Protection members 22,24 are adapted to mount about the cross members 28,29 of the frame of the bicycle 31. The protection members 22,24 being generally pad members each being made of a piece of rubber material and being adapted to prevent the cross members 28,29 from being scratched. The pad members 22,24 are sandwiched between the mounting brackets 18,20 and are adapted to sandwich the cross members 28,29 of the bicycle 31 therebetween. Each of the pad members 22,24 has a centrally-disposed hole 23,25 therethrough. The recessed portion 16 of the elongate handle member 11 is removably and securely extended through the holes 19,21,23,25 of the mounting brackets 18,20 and the pad members 22,24 and is securely fastened to the mounting brackets 18,20.

A fastening assembly 26,27 for fastening the mounting brackets 18,20, protection members 22,24 and elongate handle member 11 to the bicycle 31 includes a washer 26 and a threaded nut 27 which is removably threaded upon the threaded portion 17 of the recessed portion 16 of the elongate handle member 11. Each of the mounting brackets 18,20 and the pad members 22,24 has a quadrilateral shape to effectively mount about the cross members 28,29 of the bicycle 31. The mounting brackets 18,20 and the pad members 22,24 are adapted to mount about the cross members 28,29 of the bicycle 31 behind a seat 30 of the bicycle 31.

In use, the user grasps the first end 13 of the elongate handle member 11 and either walks or runs behind the bicycle 31 while holding onto the elongate handle member 11 to essentially guide the child who is riding the bicycle 31 so that the child does not tip over. By holding onto the first end 13 of the elongate handle member 11, the user helps the child to learn how to balance the bicycle 31.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trainer attachment for mounting on a pair of generally diverging seat stay bars of a bicycle, said attachment comprising:

an elongate handle member having a main portion, a first end portion, a second end portion, and a second end;

mounting brackets for mounting said elongate handle member to the pair of seat stay bars of a bicycle with the pair of seat stay bars positioned between said mounting brackets, each of said mounting brackets having an inward surface for positioning toward said seat stay bars, each of said mounting brackets having a substantially trapezoidal perimeter edge about said inward surface such that said perimeter edge has substantially parallel side edge portions and end edge portions of said perimeter edge converge toward one side edge portion of said perimeter edge and diverge toward another side edge portion;

protection members each being formed of an elastomeric material and being located on the inward surface of one of said mounting brackets for positioning between said mounting brackets and the seat stay bars of the bicycle for protecting a finish on the seat stay bars from contact with said mounting brackets; and a fastening assembly for fastening said mounting brackets, protection members and elongate handle member together.

2. A trainer attachment for a bicycle as described in claim 1, wherein said elongate handle member also includes a looped first end for facilitating grasping of said elongate handle member by a user.

3. A trainer attachment for a bicycle as described in claim 1, wherein said first end portion is angled relative to said main portion, and said second end portion is also angled relative to said main portion.

4. A trainer attachment for a bicycle as described in claim 1, wherein said elongate handle member further includes an annular recessed portion disposed at said second end of said elongate handle member, said annular recessed portion having a threaded portion at said second end of said elongate handle member.

5. A trainer attachment for a bicycle as described in claim 1, wherein said mounting brackets include first and second mounting brackets for mounting against portions of the seat stay bars of the bicycle, each of said mounting brackets being generally a plate member having a centrally-disposed hole therethrough.

6. A trainer attachment for a bicycle as described in claim 1, wherein said protection members are generally pad members.

7. A trainer attachment for a bicycle as described in claim 6, wherein each of said pad members has a centrally-disposed hole therethrough.

8. A trainer attachment for a bicycle as described in claim 4, wherein said recessed portion of said elongate handle member is removably extended through said holes of said mounting brackets and said pad members and is fastened to said mounting brackets.

9. A trainer attachment for a bicycle as described in claim 8, wherein said fastening assembly includes a washer and a threaded nut removably threaded upon said threaded portion of said recessed portion of said elongate handle member.

10. A trainer attachment for a bicycle as described in claim 1, wherein each of said protection members is substantially coextensive with the inward surface of one of said mounting brackets.

11. A trainer attachment for a bicycle as described in claim 1, wherein each of said mounting brackets has an inward surface for positioning toward said seat stay bars, each of said mounting brackets having a substantially trapezoidal perimeter edge about said inward surface such that said perimeter edge has substantially parallel side edge portions and end edge portions of said perimeter edge converge toward one side edge portion of said perimeter edge and diverge toward another side edge portion.

12. A trainer attachment for mounting on a pair of generally diverging seat stay bars of a bicycle, said attachment comprising:

an elongate handle member having a main portion, a first end portion, a second end portion, and a second end;

mounting brackets for mounting said elongate handle member to the pair of seat stay bars of a bicycle with the pair of seat stay bars positioned between said mounting brackets;

protection members each being formed of an elastomeric material and being located on the inward surface of one of said mounting brackets for positioning between said mounting brackets and the seat stay bars of the bicycle for protecting a finish on the seat stay bars from contact with said mounting brackets; and a fastening assembly for fastening said mounting brackets, protection members and elongate handle member together;

wherein said first end portion of said elongate handle member is formed into a loop for facilitating grasping of said elongate handle member by a user;

wherein said second end portion and said main portion of said handle member are each substantially linear, said handle member being bent between said second end portion and said main portion; and wherein the loop of said first end portion, said main portion, and said second end portions all lie in a common plane.

13. A trainer attachment for mounting on a pair of generally diverging seat stay bars of a bicycle, said attachment comprising:

an elongate handle member having a main portion, a first end portion, a second end portion, and a second end;

mounting brackets for mounting said elongate handle member to the pair of seat stay bars of a bicycle with the pair of seat stay bars positioned between said mounting brackets, each of said mounting brackets having an inward surface for positioning toward said seat stay bars, each of said mounting brackets having a substantially trapezoidal perimeter edge about said inward surface such that said perimeter edge has substantially parallel side edge portions and end edge portions of said perimeter edge converge toward one side edge portion of said perimeter edge and diverge toward another side edge portion;

protection members each being formed of an elastomeric material and being located on the inward surface of one of said mounting brackets for positioning between said mounting brackets and the seat stay bars of the bicycle for protecting a finish on the seat stay bars from contact with said mounting brackets; and a fastening assembly for fastening said mounting brackets, protection members and elongate handle member together;

wherein said first end portion of said elongate handle member is formed into a loop for facilitating grasping of said elongate handle member by a user;

wherein each of said protection members is substantially coextensive with the inward surface of one of said mounting brackets;

wherein said second end portion and said main portion of said handle member are each substantially linear, said handle member being bent between said second end portion and said main portion; and wherein the loop of said first end portion, said main portion, and said second end portions all lie in a common plane;

wherein said elongate handle member further includes an annular recessed portion disposed at said second end of said elongate handle member, said annular recessed portion having a threaded portion at said second end of said elongate handle member;

wherein said mounting brackets include first and second mounting brackets for mounting against portions of the seat stay bars of the bicycle, each of said mounting brackets being generally a plate member having a centrally-disposed hole therethrough;

wherein said protection members are generally pad members;

wherein said recessed portion of said elongate handle member is removably extended through said holes of said mounting brackets and said pad members and is fastened to said mounting brackets;

wherein said fastening assembly includes a washer and a threaded nut removably threaded upon said threaded portion of said recessed portion of said elongate handle member;

wherein said main portion of said elongate handle member has a length of approximately 27 inches; and wherein said first end of said elongate handle member is coated with a rubberized material to facilitate the grasping thereof by the user.

* * * * *